3,726,840
POLYMERIZATION OF EPISULFIDES USING METAL-CONTAINING CATALYSTS

George T. Gmitter, Fairlawn Village, Akron, Ohio, and John P. Mudde, Grosse Ile, Mich., assignors to The General Tire & Rubber Company, Akron, Ohio
No Drawing. Filed Oct. 16, 1964, Ser. No. 404,513
Int. Cl. C08g 23/00
U.S. Cl. 260—79   5 Claims

ABSTRACT OF THE DISCLOSURE

A method for making a polysulfide which comprises polymerizing an episulfide monomer in the presence either of the following catalysts:

(a) triphenyl aluminum and water
(b) antimony trioxide and diethyl zinc
(c) the reaction product of titanium tetrachloride and triethyl aluminum
(d) zinc cobalticyanide or
(e) zinc ferricyanide.

---

This invention relates to the preparation of polymers from episulfides and more particularly to episulfide polymers of improved resistance to oil, chemicals, solvents and ozone, which polymers are produced by polymerizing certain monomeric episulfides in the presence of certain metal-containing catalysts.

In the past sulfur-bearing polymers have been generally prepared by reacting an aliphatic dihalide with sodium polysulfide made from caustic and sulfur as explained in Synthetic Rubber by G. S. Whitby (1954), page 893. The reactants, being bi-functional, resulted in polymerization products. These, however, generally have been of relatively low molecular weight as determined by their low intrinsic viscosity values.

It has now been discovered that new and useful polymers of $C_2$ to $C_{14}$, preferably $C_3$ to $C_6$, episulfide compounds, which preferably are produced in the presence of certain Group II-B metal-containing catalysts, have excellent resistance to gases, chemicals, water and oil provided that the amount of the metal-containing catalyst is between about 0.0001 to 10.0 weight percent based on monomer. Such polymers are especially useful in gaskets or seals, in fuel hose, and in fabricating fuel storage vessels.

Accordingly, it is an object of the present invention to prepare new and useful polymers and copolymers derived from episulfides.

Another object of the invention is to provide such polymers from episulfides which are resistant to chemicals and oils.

It is yet another object of the invention to provide a new and improved process for the preparation of novel polymers derived from certain episulfides.

These and other objects will become apparent from the following description of the invention and the examples.

In practicing a typical process of the present invention, an episulfide monomer is polymerized to a polymer at about −80° C. to +130° C., advantageously at about −20° C. to +115° C., preferably about 5° C. or 25° C. to 40° C. or 100° C., for from 1 to 60 hours, preferably from 3 to 20 hours, and until the improved polymer is formed. Polymerization may be conducted under pressures of about 1 to 10 atmospheres, preferably in an inert atmosphere such as nitrogen and in the presence of a metal-containing catalyst as more particularly described hereinafter. The resulting polymers of the present invention have intrinsic viscosities of from about 0.8 to 1.0 to 4 or 5 as determined in benzene at 25° C.

The monomer material to be polymerized and/or the monomer materials to be copolymerized in accordance with the present invention preferably comprise at least one organic compound having about 2 to 8 or 10 aliphatic carbon atoms and having at least one episulfide group. The episulfide group is well known and is defined as a group containing two carbon atoms bridged by a single sulfur atom. It is believed that this bridge arrangement is caused to open in the process of polymerization to form the sulfide polymer of the present invention. As will be shown hereinafter, the episulfide monomers useful for purposes of the invention may be unsaturated but are preferably saturated in order to obtain polymers with intrinsic viscosities approaching 4 or 5.

Broadly stated the episulfide monomers of the present invention from which the sulfide polymers are prepared are sulfur compounds of the general formula:

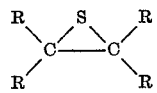

wherein R may be hydrogen or a monovalent hydrocarbon radical, such as alkyl radicals, as methyl, ethyl, propyl, butyl; alkenyl radicals, as butenyl, hexenyl, octenyl, etc.; aryl radicals, such as phenyl and the like; alkaryl radicals, such as tolyl, dimethyl phenyl, ethyl phenyl, etc.; aralkyl radicals such as benzyl, 2-phenylethyl or 3-phenylpropyl; cycloalkyl radicals such as cyclopropyl or cyclobutyl; or cycloalkenyl radicals as cyclohexenyl, etc. R may be the same or different. Although such episulfides are generally compounds of the elements sulfur, carbon and hydrogen, it has been found that certain substituted derivatives may also be used, such as fluoride, chloride, bromide, alkoxy and/or ester substituted derivatives of such episulfides.

The episulfide monomers as herein described may be prepared by reacting certain epoxides with a sulfur-releasing agent. Examples of such agents are sodium thiocyanate, thiocarbonyl compounds such as thiourea, potassium thiocyanate, etc. Such episulfide preparation is discussed in French Pat. 797,621; Chemical Abstracts, vol. 30, page 7122; Organic Synthesis; vol. 32, page 39; and Journal of American Chemical Society, vol. 75, page 4959. The episulfides most preferably have the episulfide group present as a terminal group rather than as an internal group.

Episulfides useful for the purposes of the invention include among others, such episulfides as unsaturated, saturated and mixtures thereof such as ethylene sulfide; alpha propylene sulfide, alpha butylene sulfide; isobutylene sulfide; 1,2-3,4-butadiene disulfide; allyl thioglycidyl ether; methyl thioglycidyl ether; di(epithiopropoxyphenyl) methane; 1,4-bis(2,3-epithiopropoxy) benzene; 1,2-5,6-diepithiohexane; 4,4′ - bis(3,4-epithiobutoxy) diphenyl dimethyl methane; l,2-epithio-3-chloro-propane and the like, mixtures thereof, etc. It is preferred to use lower molecular weight episulfides such as allyl thioglycidyl ether, butadiene monosulfide and in general other episulfide compounds having a molecular weight below 300.

In accordance with the invention, episulfide monomer such as aforementioned, are polymerized alone or in admixture to form copolymers, terpolymers, etc. Preferred polymers are alpha propylene sulfide with or without the comonomer allyl thioglycidyl ether. The ratio of monomers generally varies from at least about 55% or 60% to 100% alpha propylene sulfide with at least about 0 to 40% or 45% allyl thioglycidyl ether. Other preferred copolymers are from at least about 3% or 5% to 40% alpha propylene sulfide and at least about 95% or 97% to 60% ethylene sulfide.

Catalysts useful for the purpose of the invention are known in the art and include, for example, such metal-containing catalysts as diethyl zinc and water used in an amount of about one mole of diethyl zinc to about 0.1 to 1.0 mole of water, the diethyl zinc being prepared by combining zinc and an alkyl halide.

Another useful metal-containing catalyst is a catalyst of the product resulting from combining an inorganic and organic sulfur, selenium or tellurium compound with an organic aluminum, beryllium, cadmium, gallium, and/ or zinc compounds (e.g., hydrogen sulfide and diethyl zinc used in the ratio of about 0.5 to 2.5 moles of hydrogen sulfide to one mole of diethyl zinc).

Still another complex that may be used is antimony trifluoride and titanium trifluoride catalyst with a cocatayst of lithium aluminum hydride, the fluoride and halide being mixed together under reflux conditions in an inert atmosphere. The ratio of catalyst to cocatalyst is from about 1.0:0.5 to 1.0:2.7. There can be employed about one to 700 moles of monomer to one mole of catalyst and cocatalyst.

Yet another catalyst that can be used in the present invention is zinc cyanide and ammonium chloride prepared by combining the two catalysts in a mole ratio of about 1.0:0.20 to 1.0:0.6 in an inert atmosphere at about 40° to 60° C. Also useful is a triphenyl aluminum and water catalyst prepared by reacting phenyllithium and aluminum trichloride. The ratio of triphenyl aluminum to water can vary from about 1.0:0.05 to 1:1 mole. Also useful is antimony trioxide and diethyl zinc used in a ratio of 0.03:1 to 12.01:1 of organic metallic to inorganic oxide.

Another catalyst is a Ziegler-type catalyst, as for example, a complex prepared from one mole of titanium tetrachloride and one mole of triethyl aluminum. Other known catalysts are triisobutyl aluminum, triethyl aluminum, zinc cobalticyanide and zinc ferricyanide. In addition, zinc hexacyanoferrate may be used. It is prepared by reacting a zinc halide with potassium ferricyanide. Also, alkali metal-containing catalysts as potassium hydroxide and/or potassium carbonate may be used when low molecular weight polymers are desired. Certain other metal-containing catalysts may also be used.

To obtain the best activity of the catalysts for polymerization, an organic material may be added to the catalyst as a complexing agent. Examples of organic materials for use in treating the catalysts are ethers, preferable of which are the aliphatic saturated monoethers such as bis($\beta$-methoxy ethyl) ether or diglyme, ethylene glycol dimethyl ether or glyme, or triethylene glycol dimethyl ether. Other substances such as butyl cellosolve and cyclohexylamine may also be used to activate the catalyst.

The amount of catalyst may vary from 0.0001 to 10.0, weight percent, preferably from 0.001 to 5.0 weight percent based on episulfide monomer, or monomers, the most preferable range being from 0.005 to 0.5 weight percent.

Polymerization of the episulfide monomer advantageously is conducted in a solvent for the monomer and polymer which is free from active hydrogen. Examples of solvents are toluene, benzene, heptane, octane, xylene and trichloroethylene. Preferably for easy removal and recovery of the polymer, the solvent should be volatile. Polymerization advantageously is, for example, conducted in an autoclave under pressure and in an inert or nonoxidizing atmosphere. The atmosphere preferably comprises such inert gases as nitrogen, helium and mixtures thereof or a nonoxidizing vapor of solvents or monomers. It is important that moisture be excluded during polymerization. Temperatures of polymerization vary from about −20° C. to +130° C., preferably between about 5° C. and 100° C.

At the lower polymerization temperatures higher yields of the polymer have been obtained, but the polymerization time required is up to about 50 to 60 hours. At the higher polymerization temperatures, the rate of reaction is more rapid and a suitable yield and viscosity may be in as few as 1 to 3 hours. In order to obtain best yields of high viscosity polymers, polymerization is most advantageously carried out at temperatures of about 0° C. to 100° C., preferably about 20° C. to 80° C., the optimum temperature being 20° C. to 40° C. At a temperature of about 30° C., depending upon the monomer, polymerization is generally complete in about 3 to 20 hours, whereas at the lower temperature of 20° C. polymerization time may vary from about 6 to 30 hours. The pressures may vary from atmospheric to about 100 atmospheres, atmospheric pressure generally being advantageous.

The curing of the compositions of the present invention, which is normally at 50° C. to 175° C., especially at 50° C. to 160° C. may be brought about by heating preferably with sulfur and/or zinc oxide. Conventional amounts of sulfur are employed and about 0.5 to 15.0, preferably about 5.0 to 10.0 parts by weight, of zinc oxide per hundred of the sulfide polymer of the invention may be used. Cupric oxide and/or preferably lead dioxide also may be used as curing agents with or without added dicumyl peroxide, benzoyl peroxide, para dinitroso benzene, para quinone dioxine, etc. In case the polymer has unsaturation in the side chains or backbone, sulfur as well as certain conventional vulcanization accelerators are useful curing agents. The polymers may also be partially cured and used as adhesives by maintaining the polymer at temperatures of about 50° C. to 175° C., preferably from 50° C. to 160° C. to effect the partial cure.

In general, the higher the curing temperatures the shorter the curing time and vice versa. The curing time may vary from several minutes to several days, depending upon the temperature, the particular polymer, whether curatives are added, etc. Preferred curing times are from about 2 to 100 minutes.

The episulfide rubbers of the present invention are characterized by outstanding chemical resistance. The rubbers also have application in adhesives, coatings, seals, gaskets, etc. Other uses comprise encapsulation with or without added fillers well known in the art. Rocket propellent binders are another example of an application of the present invention.

The invention will be best understood with reference to the following examples which are given for purposes of illustration only and are not to be interpreted as limiting the invention.

EXAMPLE I

| | |
|---|---|
| Dry benzene | cc 20.00 |
| Alpha propylene sulfide | cc 10.00 |
| Zinc cobalticyanide | gm 0.01 |

The above reactants are placed in a closed test tube, the test tube flushed with nitrogen, sealed and the components reacted for 20 hours at 25° C. under one atmosphere of nitrogen pressure, while agitating the components. The polymeric product is recovered by dissolving in additional benzene, and precipitating with methanol, the polymer formed then being dried. The resulting rubbery polymeric product had an intrinsic viscosity of 3.8 in benzene at 25° C.

EXAMPLE II

Part A (Production of monomer)

| | G. |
|---|---|
| Allyl glycidyl ether | 342 |
| Water | 200 |
| Thiourea | 300 |

The allyl glycidyl ether and water are placed in a flask. The thiourea is added gradually with stirring over 60 minutes. The reaction is exothermic and is allowed to reach a limit of 60° C. by the controlled use of an ice bath. After 3 hours, reaction ceases and the ice bath is removed. When the temperature drops to 35° C., agitation is stopped and two layers of mixture are formed. The upper layer is over 97% pure allyl thioglycidyl ether, the lower layer being a saturated solution of urea in water. The upper layer is flash distilled in a vacuum and fractionated to purify the product. The product has a boiling point of 73.6° C. at 14 mm. pressure, the refractive index, $n_D^{25}$, being 1.4920. The conversion of allyl glycidyl ether to allyl thioglycidyl ether is 70%.

Part B (Polymerization of the allyl thioglycidyl ether monomer)

| | |
|---|---|
| Allyl thioglycidyl ether cc | 5.00 |
| Benzene solvent cc | 10.00 |
| $Zn_3(Co(CN)_6)_2$ gm | 0.01 |

The allyl thioglycidyl ether of Part A is polymerized by introducing the glycidyl episulfide compound, benzene-solvent and catalyst, $Zn_3(Co(CN)_6)_2$ into a sealed reactor, flushing the reactor with nitrogen, agitating the mixture and while agitating, polymerizing the monomer to a polymer by heating for 10 hours at 40° C. The polymer is separated from the solvent by dissolving in additional benzene and precipitating the polymer with methanol. The polymer is then dried and is found to have an intrinsic viscosity in benzene at 25° C. of 2.1.

EXAMPLE III

| | |
|---|---|
| Allyl thioglycidyl ether cc | 75.00 |
| Benzene solvent cc | 350.00 |
| $Zn_3(Co(CN)_6)_2$ g | 0.15 |

The process of Example II is repeated except the monomer is polymerized at 30° C. for 16 hours in a closed autoclave under a pressure of one atmosphere of nitrogen. The resulting polymer has an intrinsic viscosity in benzene at 25° C. of 2.6.

EXAMPLE IV

Fifty-eight cc. of pure alpha propylene sulfide monomer and 32 cc. of pure allyl thioglycidyl ether monomer which is prepared in accordance with Example II are added to a bottle containing 0.6 gm. of zinc cobalticyanide and 200 cc. of dry benzene. The bottle then is placed in a 30° C. reactor and polymerized for 16 hours. When reaction is completed, the polymer is dissolved in additional benzene, precipitated with methanol and dried in a vacuum oven at 50° C. The reaction yields 85 gm. of copolymer, a conversion of monomer to copolymer of 94%. The intrinsic viscosity is 2.9 in benzene at 25° C. and the product contains 75% polymerized alpha propylene sulfide and 25% polymerized allyl thioglycidyl ether by weight. The product, after drying, is a colorless, elastomeric copolymer curable at elevated temperatures.

EXAMPLE V

The polymeric material of Example IV is partially cured by heating at a temperature of 75° C. for 60 minutes and is found to be useful as an adhesive. Complete cure of the polymer is accomplished by heating at 150° C. for 20 minutes.

EXAMPLE VI

The polymer obtained in Example IV is found to be rubbery and is vulcanizable according to the following formulation:

| Ingredients: | Parts by weight |
|---|---|
| Polymer (of Example IV) | 100 |
| HAF carbon black | 50 |
| Zinc oxide | 5 |
| Sulfur | 2 |
| N-cyclohexyl-2-benzothiazole sulfinamide (Santocure) | 1 |
| Phenyl-beta-naphthylamine (antioxidant) | 1 |
| Stearic acid | 1 |

The polymer is vulcanized for three minutes at 143° C. and is found to have a Mooney viscosity (ML–4) of 69.0.

EXAMPLES VII–IX

Polymerization of episulfides with zinc diethyl·$H_2O$ catalysts

The following polymerizations are made using the indicated monomers and catalysts in an anhydrous benzene system in sealed test tubes. The test tubes are flushed with nitrogen, sealed and the reaction mixture polymerized for 7 hours at 80° C. under an atmosphere of nitrogen, with agitation. The resulting polymers are recovered as indicated in Example I with the results listed in the following table.

TABLE I

| Example | Monomer | Benzene solvent to monomer ratio | Catalyst $ZnEt_2 \cdot H_2O \cdot$ glyme,[1] mol percent | Polymer[2] intrinsic viscosity |
|---|---|---|---|---|
| VII | Alpha butylene sulfide | 10:1 | 0.75 | 0.83 |
| VIII | Alpha propylene sulfide and ethylene sulfide (75/25 mol percent mixture) | 10:1 | 0.1 | 4.28 |
| IX | Alpha propylene sulfide | 10:1 | [3] 0.2 | 2.81 |

[1] Glyme is ethylene glycol dimethyl ether.
[2] Intrinsic viscosity in benzene at 25° C.
[3] $ZnEt_2 \cdot H_2O$ without glyme.

EXAMPLE X

Fifty-eight cc. of distilled alpha propylene sulfide and 21 cc. of distilled butadiene monosulfide are blended with 200 cc. anhydrous benzene containing 0.5 gram of zinc ferricyanide catalyst. The system is evacuated, sealed and placed in a 40° C. reaction bath and polymerized for 16 hours. The copolymer formed is dissolved in additional benzene, precipitated with methanol and dried in a vacuum oven at 50° C. Conversion of monomer to copolymer is 91 percent, the intrinsic viscosity in benzene at 25° C. being 2.76.

In the claims, the term polymer is intended to include polymers, copolymers, terpolymers and the like.

Modifications and variations of this invention may be made without departing from the spirit and scope thereof and it is intended that the invention be construed and interpreted only as provided in the following appended claims.

What is claimed is:

1. The method of making a polysulfide having an intrinsic viscosity of from about 0.8 to 5.0 in benzene at 25° C. which comprises polymerizing an episulfide monomer having a ring of 2 carbon atoms and one sulfur atom under an inert atmosphere at a temperature of from about −20 to +130° C. in admixture with a catalyst selected from the group consisting of (a) triphenyl aluminum and water in a mol ratio of from about 1.0:0.05 to 1:1, (b) antimony trioxide and diethyl zinc in a mol ratio of from 1:0.03 to 1:12.0, (c) the reaction product of titanium tetrachloride and triethyl aluminum in a mol ratio of 1:1,
(d) zinc cobalticyanide, and
(e) zinc ferricyanide, said catalyst being used in an amount of from 0.001 to 5.0 weight percent based on said monomer, and said monomer having a total of from 2 to 14 carbon atoms.

2. The method according to claim 1 in which said catalyst has been complexed with a material selected from the group consisting of bis($\beta$-methoxy ethyl)ether, ethylene glycol dimethyl ether and triethylene glycol dimethyl ether.

3. The method according to claim 2 in which said catalyst is used in an amount of from 0.005 to 0.5 weight percent based on said monomer.

4. The method according to claim 3 in which the catalyst is zinc cobalticyanide.

5. The method according to claim 3 in which the catalyst is zinc ferricyanide.

References Cited

UNITED STATES PATENTS

| | | | |
|---|---|---|---|
| 3,624,052 | 11/1971 | Gobran et al. | 260—79 R |
| 3,300,454 | 1/1967 | Osborn | 260—79.7 |
| 3,317,920 | 5/1967 | Sander | 260—79 |
| 3,337,513 | 8/1967 | Kutch et al. | 260—79.7 |
| 3,359,248 | 12/1967 | Osborn et al. | 260—79.7 |
| 3,365,429 | 1/1968 | Gobran et al. | 260—79 |
| 3,365,431 | 1/1968 | Gobran et al. | 260—79.7 |
| 3,472,821 | 10/1969 | Osborn | 260—79 |
| 3,489,728 | 1/1970 | Bailey, Jr. et al. | 260—79 |
| 3,624,055 | 11/1971 | Gobran et al. | 260—79.7 |
| 3,637,613 | 1/1972 | Vandenberg | 260—79 |

DONALD E. CZAJA, Primary Examiner

M. I. MARQUIS, Assistant Examiner

U.S. Cl. X.R.

260—37 R, 41 R, 45.9 R, 79.1, 79.7, 327 E

PO-1050
(5/69)

UNITED STATES PATENT OFFICE
CERTIFICATE OF CORRECTION

Patent No. 3,726,840　　　　　　　　　Dated April 10, 1973

Inventor(s) George T. Gmitter and John P. Mudde

It is certified that error appears in the above-identified patent and that said Letters Patent are hereby corrected as shown below:

Column 3, line 31, which reads: "12.01:1" should read ---12.0:1---.

Signed and sealed this 29th day of January 1974.

(SEAL)
Attest:

EDWARD M. FLETCHER, JR.　　　　　RENE D. TEGTMEYER
Attesting Officer　　　　　　　　　Acting Commissioner of Patents